United States Patent
Huang et al.

(10) Patent No.: US 12,359,088 B2
(45) Date of Patent: Jul. 15, 2025

(54) AMBIENT CURE HIGH TEMPERATURE PROTECTIVE COATING

(71) Applicant: PPG Industries Ohio, Inc., Cleveland, OH (US)

(72) Inventors: Qiang Huang, West Roxbury, MA (US); Dikran Betzig, Bolton, MA (US)

(73) Assignee: PPG INDUSTRIES OHIO, INC., Cleveland, OH (US)

(*) Notice: Subject to any disclaimer, the term of this patent is extended or adjusted under 35 U.S.C. 154(b) by 863 days.

(21) Appl. No.: 17/416,749

(22) PCT Filed: Dec. 17, 2019

(86) PCT No.: PCT/IB2019/060880
§ 371 (c)(1),
(2) Date: Jun. 21, 2021

(87) PCT Pub. No.: WO2020/128805
PCT Pub. Date: Jun. 25, 2020

(65) Prior Publication Data
US 2022/0135837 A1    May 5, 2022

Related U.S. Application Data

(60) Provisional application No. 62/781,636, filed on Dec. 19, 2018.

(51) Int. Cl.
| | |
|---|---|
| *C08K 3/32* | (2006.01) |
| *C08K 5/56* | (2006.01) |
| *C08L 83/06* | (2006.01) |
| *C09D 5/08* | (2006.01) |
| *C09D 183/04* | (2006.01) |

(52) U.S. Cl.
CPC ........... *C09D 183/04* (2013.01); *C08K 3/32* (2013.01); *C08K 5/56* (2013.01); *C08L 83/06* (2013.01); *C09D 5/084* (2013.01); *C08K 2003/328* (2013.01); *C08L 2205/02* (2013.01)

(58) Field of Classification Search
CPC ........ C09D 183/04; C09D 5/084; C08K 3/32; C08K 5/56; C08K 3/34; C08K 3/38; C08K 2003/222; C08K 2003/321; C08L 83/06; C08G 77/80; C08G 77/18
USPC ........................................... 524/588
See application file for complete search history.

(56) References Cited

U.S. PATENT DOCUMENTS

| | | | |
|---|---|---|---|
| 7,452,945 B2 | 11/2008 | Nixon | |
| 8,722,835 B2 | 5/2014 | Mowrer et al. | |
| 9,006,355 B1 | 4/2015 | Fish | |
| 2003/0220460 A1* | 11/2003 | Merfeld | C08L 71/126 585/428 |
| 2009/0269697 A1* | 10/2009 | Kato | G03F 7/40 528/25 |
| 2010/0316888 A1* | 12/2010 | Stalker | C09D 1/00 427/372.2 |
| 2014/0342166 A1 | 11/2014 | Yang et al. | |
| 2016/0160081 A1 | 6/2016 | Klotzbach et al. | |
| 2016/0304745 A1 | 10/2016 | Iida et al. | |
| 2017/0101541 A1 | 4/2017 | Roth et al. | |
| 2018/0334587 A1 | 11/2018 | Betzig et al. | |

FOREIGN PATENT DOCUMENTS

| | | |
|---|---|---|
| CN | 104470983 A | 3/2015 |
| CN | 105473673 A | 4/2016 |
| CN | 106883754 A | 6/2017 |
| JP | 2019-006982 A | 1/2019 |
| KR | 19980019803 A | 6/1998 |
| KR | 20010060092 A | 7/2001 |
| KR | 20180012177 A | 2/2018 |
| WO | 2014/164202 A1 | 10/2014 |

* cited by examiner

*Primary Examiner* — Hannah J Pak

(57) ABSTRACT

An ambient curable coating composition includes a mixture of components comprising a polysiloxane having a Mw of at least 10,000 as determined by gel permeation chromatography using a polystyrene standard, (b) an alkoxy functional polysiloxane, and (c) an inorganic corrosion inhibitor, a method of preparing a corrosion resistant coating comprising (i) applying the coating composition to a substrate and (ii) curing component (b) at ambient conditions; and a substrate at least partially coated with the coating composition.

12 Claims, 1 Drawing Sheet

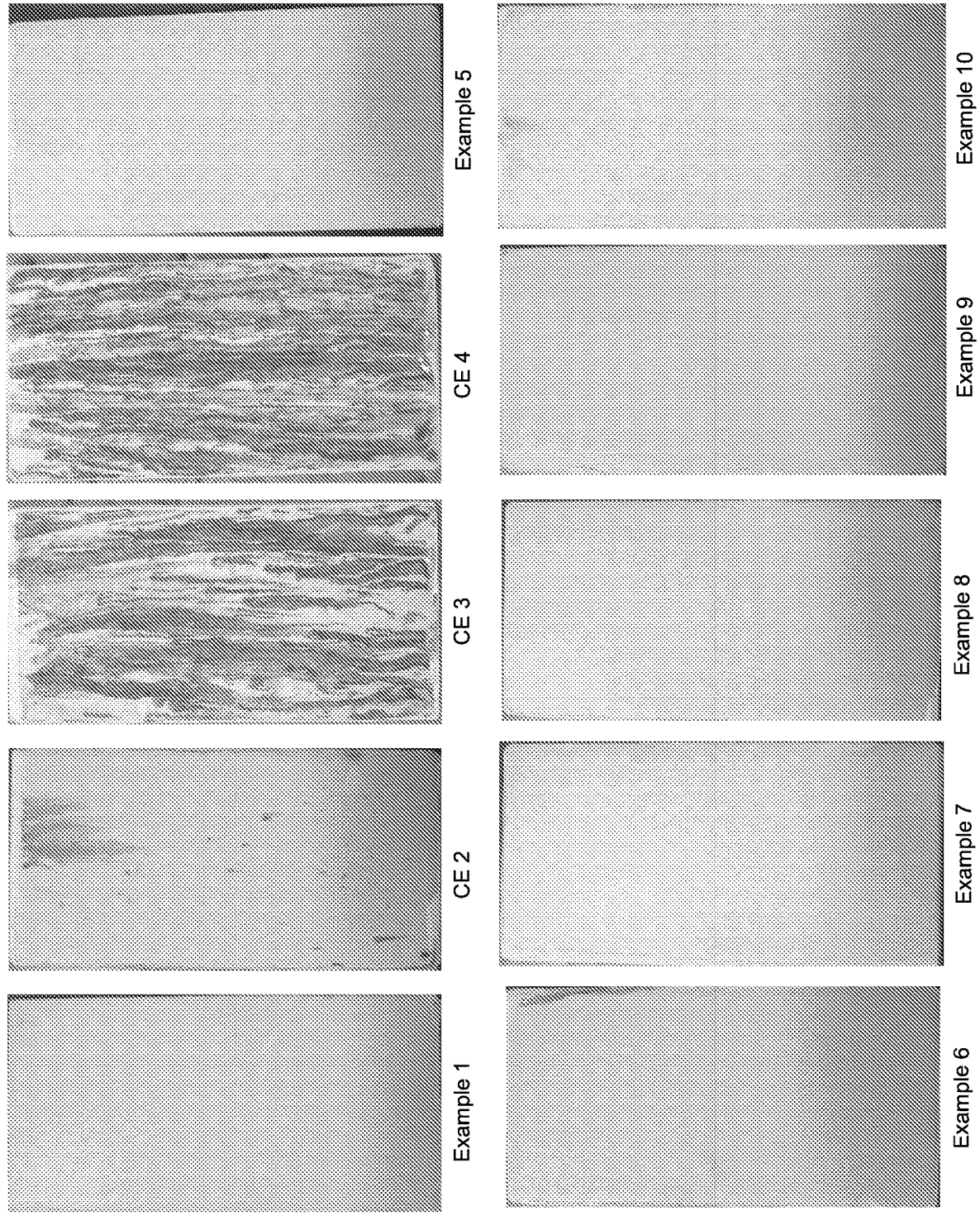

AMBIENT CURE HIGH TEMPERATURE PROTECTIVE COATING

FIELD OF THE INVENTION

The present invention relates to silicone coating compositions, coatings formed therefrom, and methods of forming such coatings.

BACKGROUND OF THE INVENTION

Silicone polymers have been used in corrosion resistance coatings. Such silicone polymers typically are applied to a substrate, air dried, and then cured at elevated temperatures of 175-200° C. (350-400° F.). During use at temperatures above 350° C. (660° F.) such coatings tend to become porous, thereby reducing their protective effect on the substrate.

SUMMARY OF THE INVENTION

The present invention comprises an ambient curable coating composition comprising a mixture of components comprising (a) a polysiloxane having a Mw of at least 10,000 as determined by gel permeation chromatography, (b) an alkoxy polysiloxane, and (c) an inorganic corrosion inhibitor; a method of preparing a coating comprising (i) applying the coating composition to a substrate and (ii) curing component (b) at ambient conditions; and a substrate at least partially coated with the coating composition.

BRIEF DESCRIPTION OF THE DRAWING

FIG. 1 is a set of photographs of the coated panels tested in Examples 1-10.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" crosslinker, and the like refer to one or more of any of these items.

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The silicone coating composition of the present invention is curable at ambient conditions, e.g. at ambient temperature, such as in the range of 2–60° C. (including room temperature, e.g. 20-25° C.) and relative humidity in the range of 1-100%. The ambient curable coating composition includes (a) a polysiloxane having a molecular weight (Mw) of at least 10,000 or at least 20,000 or at least 100,000 or at least 200,000 (all Mw disclosed herein being determined by gel permeation chromatography using a polystyrene standard for calibration), (b) an alkoxy polysiloxane and (c) an inorganic corrosion inhibitor, as well as an optional curing agent.

Polysiloxane

The polysiloxane (a) having a Mw of at least 10,000, such as at least 20,000 or at least 100,000 or at least 200,000 may be referred to herein relative to other polymeric components as a "high Mw polysiloxane". Suitable polysiloxanes have the formula (I):

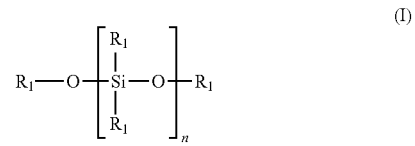

(I)

where each $R_1$ is independently a hydroxy group or an alkyl, aryl, or alkoxy group having up to six carbon atoms, and where n is selected so that the molecular weight for the polysiloxane is at least 10,000. Such high Mw polysiloxanes are commercially available, such as SILRES REN 50, SILRES REN 60, and SILRES REN 80 from Wacker Chemical Corporation (Adrian, MI) or DOWSIL RSN-0805, DOWSIL RSN-0806, and DOWSIL RSN-0808 from Dow Chemical Company (Midland, MI) or SILIKOPHEN P50/X and SILIKOPHEN P80/X from Evonik Corporation (Parsippany, NJ).

Alkoxy Polysiloxane

The alkoxy polysiloxane (b) used in the present invention includes polysiloxanes different from the polysiloxane (a) and having the general formula (II):

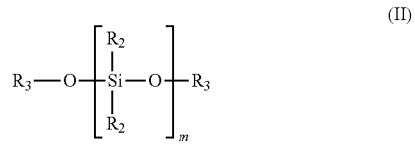

(II)

where each $R_2$ group may be hydrogen, alkyl, or alkoxy, and each $R_3$ group may be alkoxy or acetoxy, each of $R_2$ and $R_3$ having up to six carbon atoms, where m is selected so that the molecular weight for the alkoxy polysiloxane is up to 8,000. Such alkoxy polysiloxanes are commercially available, such as SILRES MSE 100 from Wacker Chemical Corporation (Adrian, MI) and DOWSIL 2403 from Dow Chemical Company (Midland, MI). For example, the $R_2$ group may be a methyl group of a methoxy functional methyl polysiloxane. The alkoxy polysiloxane is moisture curable, meaning that it is further polymerized and/or crosslinked in the presence of moisture that is available in the surrounding atmosphere. The polysiloxane is further polymerized and/or crosslinked, typically using water that is available in the surrounding atmosphere (i.e. as moisture), and present within the curable coating composition. Water hydrolyzes alkoxy groups on the polysiloxane, resulting in free hydroxyl groups. In a subsequent condensation reaction between the free hydroxyl groups, the polysiloxane is considered to be cured. This reaction mechanism may be described as a hydrolysis-condensation mechanism, with the reactions typically catalyzed with an alkyl titanate (hydrolysis reaction) and a strong base (condensation reaction).

Inorganic Corrosion Inhibitor

The coating composition of the present invention includes an inorganic corrosion inhibitor such as magnesium oxide, zinc phosphate, metal-modified zinc phosphates, metal-modified phosphosilicate and/or metal-modified borosilicate, wherein the metal comprises calcium, barium, strontium, molybdenum, magnesium, and/or aluminum and "metal-modified" refers to metal additives included therewith. By "corrosion inhibitor" it is meant a component that improves corrosion resistance, i.e. the resistance of the coating against reaction with or other degradation by adverse conditions in the surrounding environment, of an underlying substrate as compared to the same coating composition except not containing the corrosion inhibitor.

Curing Agent

When present, the curing agent may comprise an organometallic compound such as alkyl titanate, e.g. tetra-n-butyl titanate, acids (such as sulphonic, phosphoric, boric acids), zinc compounds, acetyl acetonate and various other basic compounds.

The polysiloxane (a) may be present in the coating composition (with all references to percentages herein based on the entire coating composition, including solvent, in a ready-to-use form) in an amount of 1 weight (wt.) % or greater, or 2 wt. % or greater or may be present at 20 wt. % or less, or 5 wt. % or less, or 12 wt. % or less. The polysiloxane (a) may be present in the coating composition in a wt. % range of from 1-20, such as 2-15 or 2-12 or another range in combination using these endpoints. The alkoxy polysiloxane (b) maybe present in the coating composition in an amount of 2 wt. % or greater, or 3 wt. % or greater, or 5 wt. % or greater, or may be present at 40 wt. % or less, or 30 wt. % or less, or 25 wt. % or less. The alkoxy polysiloxane (b) may be present in the coating composition in a wt. % range of from 2-40, such as 3-30 or 5-25 or another range in combination using these endpoints. The inorganic corrosion inhibitor (c) may be present in the coating composition in an amount of 1 wt. % or greater, or 2 wt. % or greater, or 4 wt. % or greater, or may be present at 35 wt. % or less, or 25 wt. % or less, or 20 wt. % or less. The coating composition in (c) may be present in the coating composition in a wt. % range of from 1-35, such as 2-25 or 4-20. The optional curing agent may be present in the coating composition in an amount of 0.05 wt. % or greater, or 0.1 wt. % or greater, or 0.2 wt. % or greater or may be present at 5 wt. % or less, or 3 wt. % or less, or 2 wt. % or less, or may be present in a wt. % range of 0.05-5, such as 0.1-3, or 0.2-2, or another range in combination using those endpoints.

The ambient curable coating composition of the present invention may be prepared as a "two component" system, wherein a first component includes a blend of the high Mw polysiloxane (a) the alkoxy polysiloxane, (b) the inorganic corrosion inhibitor, and (c) and a second component includes a curing agent. Additional high Mw polysiloxane (a) may be present in the second component. The inorganic corrosion inhibitor (c) may alternatively be present in the second component or in both components. The first and second components are subsequently mixed together prior to application to a substrate. The ambient curable coating composition of the present invention may also be prepared as a "one component" where all components are mixed together prior to application to a substrate.

The present invention is described herein with reference to a two component system for the general purpose of shelf life, in that curing of the coating composition does not begin until the materials are all combined, therefore by maintaining the second component separate from the first, the system can be stable (will not cure) for an extended period of time. However, this is not meant to be limiting as a one component system is also encompassed by the present invention even if its shelf life (time period prior to curing) is relatively short.

The substrate onto which the coating composition of the present invention may be applied may be made of any suitable material, particularly from materials (such as metals) that may be subject to degradation such as blistering, cracking, failed adhesion and/or corrosion in certain environments. A metal substrate suitable for use with the present invention may include ferrous or non-ferrous materials such as tin, aluminum, steel, such as, stainless steel, tin-plated steel, chromium passivated steel, galvanized steel, or coiled steel, or other coiled metal, and any metallic alloys thereof. Such substrates may be used in aggressive environments such that corrosion control and insulation are desired, often termed coating under insulation (CUI), at temperatures from cryogenic to 1000° F. (540° C.). Industries where such aggressive environments are found include aerospace, power, manufacturing, petrochemical, pulp and paper, and military. Such substrates may be at least a portion of a component of industrial, chemical, and/or process equipment. Nonlimiting examples thereof include reactors, exhaust stacks, reformers, distillation columns, piping, vessels (including storage tanks for materials such as industrial liquids, hydrocarbon fuels and liquid natural gas), valves, heat exchangers, boilers, and/or aircraft engines.

While not wishing to be bound by any particular theory, it is believed that in the coating composition of the present invention, the high Mw polysiloxane and alkoxy polysiloxane form a hybrid polysiloxane where the high Mw polysiloxane provides flexibility and contributes to temperature resistance to the resulting coating, while the alkoxy polysiloxane allows for ambient curing and contributes to the temperature resistance to the resulting coating. In addition, it is believed that the inorganic corrosion inhibitor creates a "self-healing" aspect to the resultant coating, in that porosity which develops in conventional silicone coatings at high temperatures (above 350° C.) is minimized or avoided by the presence of the inorganic corrosion inhibitor via an interaction with the polysiloxanes. In this manner, the high Mw polysiloxane, alkoxy polysiloxane, and inorganic corrosion inhibitor form a protective organometallic coating on the substrate. A person skilled in the art working the present invention will know that the selection of the particular compounds for each of (a) a polysiloxane having a Mw of at least 10,000 as determined by gel permeation chromatography, (b) an alkoxy polysiloxane, and (c) an inorganic corrosion inhibitor will depend on the particular application of the coating composition. For example, if the coating composition was intended to be used on a metal substrate then the skilled person may select particular components of (a), (b) and (c) to achieve a desired corrosion resistance, adhesion to the substrate and/or heat resistance, depending on the environments of end use.

The coating compositions may comprise one or more other components, including but not limited to, mono- and di-epoxides, moisture scavengers, pigments, such as barrier pigments (e.g. MIOX micaceous iron oxides and/or leafing aluminum) and borate pigments (e.g. BUSAN 11-M2 multifunctional pigment, available from Buckmar Laboratories, Inc., Memphis, TN), aggregates, rheological modifiers, plasticizers, antifoam agents, adhesion promoters, suspending agents, thixotropic agents, catalysts, pigment wetting agents, bituminous and asphaltic extenders, antisettling agents, diluents, UV light stabilizers, air release agents, dispersing aids, solvents, surfactants, inorganic dryers or mixtures of any thereof. Suitable inorganic dryers (materials that readily take up water in the coating composition and become hydrated) include metallic dryers, such as manganese, zirconium, cerium, rare earth, cobalt, zinc, calcium, lithium barium, and copper. Selection of suitable solvents used in the coating composition of the present invention will be appreciated by those of skill in the art and include, but are not limited to toluene, xylene, dimethyl carbonate, and aromatic 150 solvent blend.

One of ordinary skill in the art of resin coating compositions would understand that such other common components may be incorporated into the coating composition. The coating composition may comprise up to 50% by weight of such components.

For example, the coating composition of the present invention may include, but is not limited to, the components listed in Table 1. In use, the Part A components are combined together and the Part B components are combined together, and thereafter Parts A and B are combined, with Parts A and B each totaling 100%.

TABLE 1

| Description | Range wt. % |
|---|---|
| Part A | |
| Solvent | 1.5-20% |
| Alkoxy functional polysiloxane | 5-30% |
| Polysiloxane (Mw ≥10,000) | 1-15% |
| Mineral filler | 0.5-5% |
| Silane (water scavenger) | 0.05-1% |
| Coupling agent | 0.05-1% |
| Wetting and dispersing additive | 0.05-1% |
| Rheological additive | 0.1-2% |
| Silicate mineral filler | 3-30% |
| Barrier pigments | 10-45% |
| Catalyst | 0.05-2% |
| Part B | |
| Solvent | 1.5-12% |
| Coupling agent | 0.05-1% |
| Wetting and dispersing additive | 0.05-1% |
| Borate pigment | 1-15% |
| Rheological additive | 0.1-2% |
| Corrosion inhibitor | 1-30% |
| Mineral filler | 1-10% |

TABLE 1-continued

| Description | Range wt. % |
|---|---|
| Polysiloxane (Mw ≥10,000) | 1-15% |
| Solvent | 1-15% |
| Dryer | 0.05-1% |

The coating composition of the present invention may be applied to the substrate by various methods. For example, the coating composition of this disclosure may be formulated for application with conventional air, airless, air-assisted airless and electrostatic spray equipment, brush or roller. The compositions may be used as protective coatings for steel, aluminum, concrete and other substrates at dry film thicknesses in the range of from 25 micrometers to two millimeters.

Coating compositions described herein can be applied to a surface to be treated by conventional techniques such as spraying or brushing or the like, and may be applied in films of from 50 to 400 micrometers in thickness, or up to 1.5 millimeters in thickness. If necessary, multiple layers of the coating composition may be applied to the surface to be protected. For example, for use with a metal substrate, such as in the chemical industry, the coating may be applied with a dry film thickness of 75 to 350 micrometers to provide a desired degree of protection to the underlying surface. On other surface structures, coatings of appropriate thickness may be applied to provide the desired level of protection. The coating composition, once applied to the at least one surface of the substrate may be allowed to cure at ambient conditions until fully cured or, alternatively, may be cured at an elevated temperature, from above ambient temperature up to 150° C.-200° C., for example, by placing the coated substrate in a drying or curing oven. The substrate may be removed from the oven after complete curing of the coating composition or after partial curing of the coating composition, after which the coating composition may continue to cure on the substrate at ambient temperature until complete cure is attained.

Surfaces suitable for the compositions provided herein may comprise any desirable substantially solid material. For example, the types of surfaces that can be treated with the compositions of this disclosure includes glass; fiberglass; carbon fiber composites; basalt fiber composites; siloxane and ceramic fibers; ceramics, such as, silicon nitride, silicon carbide, silica, alumina, zirconia, and the like; metals, such as, for example, iron, stainless steel, galvanized steel, zinc, aluminum, nickel, copper, magnesium and alloys thereof, silver and gold and the like; plastics, such as, polymethyl methacrylate, polyurethane, polycarbonate, polyesters including polyethylene terephthalate, polyimides, polyamides, epoxy resins, ABS polymer, polyethylene, polypropylene, polyoxymethylene; porous mineral materials, such as, concrete, clay bricks, marble, basalt, asphalt, loam, terracotta; organic materials, such as wood, leather, parchment, paper and textiles; and coated surfaces, such as, plastics emulsion paints, acrylic coatings, epoxy coatings, melamine resins, polyurethane resins and alkyd coatings. The surface or substrate contemplated herein may also comprise at least two layers of materials. One layer of material, for example, may include glass, metal, ceramic, plastics, wood or composite material. Other layers of material comprising the surface or substrate may include layers of polymers, monomers, organic compounds, inorganic compounds, organometallic compounds, continuous layers, porous and nanoporous layers.

The present invention is also directed to the following clauses, without being limited thereto.

A first clause is directed to an ambient curable coating composition comprising a mixture of components comprising (a) a polysiloxane having a Mw of at least 10,000 as determined by gel permeation chromatography using a polystyrene standard for calibration; (b) an alkoxy polysiloxane; and (c) an inorganic corrosion inhibitor. A second clause is directed to the coating composition of clause one, further comprising a curing agent for curing component (b) by moisture curing. Clause three is directed to the coating composition of clauses one or two, where the Mw of component (a) is at least 100,000. Clause four is directed to the coating composition of clauses one or two, where the Mw of component (a) is at least 200,000. Clause five is directed to the coating composition of any of clauses one to four, wherein component (a) comprises an alkyl aryl polysiloxane. Clause six is directed to the coating composition of any of clauses one to five, wherein component (b) comprises an alkoxy functional alkyl polysiloxane. Clause seven is directed to the coating composition of any of clauses one to six, wherein the inorganic corrosion inhibitor (c) comprises magnesium oxide, zinc phosphate, metal-modified zinc phosphates, metal-modified phosphosilicate and/or metal-modified borosilicate, wherein the metal comprises calcium, barium, strontium, molybdenum, magnesium, and/or aluminum. Clause eight is directed to a method of preparing a coating comprising: (i) applying the coating composition of any of clauses one to seven to a substrate; and (ii) curing component (b) at ambient conditions. Clause nine is directed to the method of clause eight, further comprising prior to step (i) preparing a mixture of reactants comprising a first component comprising the polysiloxane (a) and the alkoxy functional polysiloxane (b) and a second component comprising the inorganic corrosion inhibitor (c); and mixing the first and second components. Clause ten is directed to the method of clauses eight or nine, wherein the second component further comprises additional polysiloxane (a). Clause eleven is directed to the method of any of clauses eight to ten, further comprising an additional step of curing the alkoxy functional polysiloxane component (b) at a temperature of at least 200° F. Clause twelve is directed to a substrate at least partially coated with the coating composition of any of clauses one to seven. Clause thirteen is directed to the substrate of clause twelve, wherein the substrate is metal. Clause fourteen is directed to an industrial processing component comprising the substrate of clauses twelve or thirteen. Clause fifteen is directed to the industrial processing component of clause fourteen wherein the component comprises a reactor, exhaust stack, reformer, distillation column, piping, valve, heat exchange, boiler or storage tank, or aircraft engine. Clause sixteen is directed to the coating composition of any of clauses one to seven wherein the polysiloxane (a) is present in an amount by weight of 1-20% or 2-15% or 2-12%. Clause seventeen is directed to the coating composition of any of clauses one to seven, sixteen, or seventeen, wherein the inorganic corrosion inhibitor is preset in an amount by weight of 1-35% or 2-25% or 4-20%. Clause nineteen is directed to the coating composition of any of clauses one to seven or sixteen to eighteen, further comprising a curing agent for moisture curing alkoxy polysiloxane (b) in an amount by weight of 0.05-5 or 0.1-3 or 0.2-2.

Illustrating the invention are the following examples that are not to be considered as limiting the invention to their details. All parts and percentages in the examples, as well as throughout the specification, are by weight unless otherwise indicated.

EXAMPLES

The following formulations were prepared from the components listed and as described.

Example 1

| Description | Lbs. |
|---|---|
| Part A | |
| To a clean container, the following were slowly added under agitation | |
| Toluene | 10.21 |
| N-butyl-alcohol | 0.58 |
| Xylene | 1.62 |
| Dimethyl carbonate | 0.63 |
| SILRES REN50[1] (polysiloxane, Mw >100,000) | 8.98 |
| GENIOSIL XL 10[2] (alkoxy silane) | 0.42 |
| KEN-REACT KR30[3] | 0.38 |
| ANTI-TERRA U[4] | 0.38 |
| BENTONE SD-1[5] | 1.00 |
| MICRO MICA C-3000[6] | 14.68 |
| Calcium silicate | 2.57 |
| High speed mixing (Cowles) to a grind greater than #5 (Hegman) for (20-60 minutes) | |
| Afterwards, the following were added while mixing | |
| Barrier pigment[7] | 39.91 |
| SILRES MSE 100[8] (methyl polysiloxane) | 17.75 |
| Tetra-n-butyl titanate | 0.89 |
| Total | 100 |
| Part B | |
| To a clean container, the following were slowly added under agitation | |
| N-butyl-alcohol | 0.63 |
| Aromatic 150 solvent | 7.85 |
| Xylene | 3.52 |
| Dimethyl carbonate | 17.12 |
| SILRES REN50 (polysiloxane, Mw >100,000) | 11.87 |
| KEN-REACT KR30 | 0.41 |
| ANTI-TERRA U | 0.41 |
| Borate pigment | 16.69 |
| BENTONE SD-1 | 1.09 |
| HALOX SZP 391[9] | 28.75 |
| VANSIL W-30 WOLLASTONITE[10] | 11.12 |
| High speed mixing (Cowles) to a grind greater than #5 (Hegman) for (20-60 minutes) | |
| Afterwards, the following were added while mixing | |
| Inorganic dryer | 0.54 |
| Total | 100 |

[1]Methylphenyl polysiloxane, Mw >100,000, available from Wacker Chemical Corporation (Adrian, MI)
[2]Vinyl alkoxy silane, available from Wacker Chemical Corporation (Adrian, MI)
[3]Titanate coupling agent, available from Kenrich Petrochemicals, Inc. (Bayonne, NJ)
[4]Wetting agent, available from BYK USA Inc. (Wellingford, CT)
[5]Rheology modifier, available from Elementis Specialties (East Windsor, NJ)
[6]Micronized mica, available from Imerys Talc America, Inc. (Houston, TX)
[7]MIOX, available from Kish Company (Mentor, OH)
[8]Methyl polysiloxane, available from Wacker Chemical Corporation (Adrian, MI)
[9]Zinc phosphate, available from ICL Specialty Products, Inc. (Hammond, IN)
[10]Mineral filler, available from Vanderbilt Minerals (Norwalk, CT)

Comparative Example 2

| Description | Lbs. |
|---|---|
| Part A | |
| To a clean container, the following were slowly added under agitation | |
| Toluene | 9.25 |
| N-butyl-alcohol | 0.53 |

-continued

| Description | Lbs. |
|---|---|
| Xylene | 1.47 |
| Dimethyl carbonate | 0.57 |
| SILRES REN50 (polysiloxane, Mw >100,000) | 8.13 |
| GENIOSIL XL 10 (alkoxy silane) | 0.38 |
| KEN-REACT KR30 | 0.34 |
| ANTI-TERRA U | 0.34 |
| BENTONE SD-1 | 0.91 |
| MICRO MICA C-3000 | 15.83 |
| Calcium silicate | 2.33 |
| High speed mixing (Cowles) to a grind greater than #5 (Hegman) for (20-60 minutes) | |
| Afterwards, the following were added while mixing | |
| Barrier pigment | 43.03 |
| SILRES MSE100 (methyl polysiloxane) | 16.08 |
| Tetra-n-butyl titanate | 0.80 |
| Total | 100 |

Part B

| | |
|---|---|
| To a clean container, the following were slowly added under agitation | |
| N-butyl-alcohol | 0.82 |
| Aromatic 150 solvent | 10.26 |
| Xylene | 4.60 |
| Dimethyl carbonate | 22.37 |
| SILRES REN50 (polysiloxane, Mw >100,000) | 15.51 |
| KEN-REACT KR30 | 0.54 |
| ANTI-TERRA U | 0.54 |
| Borate pigment | 25.95 |
| BENTONE SD-1 | 1.43 |
| VANSIL W-30 WOLLASTONITE | 17.29 |
| High speed mixing (Cowles) to a grind greater than #5 (Hegman) for (20-60 minutes) | |
| Afterwards, the following were added while mixing | |
| Inorganic dryer | 0.71 |
| Total | 100 |

Comparative Example 3

| Description | Lbs. |
|---|---|
| Part A | |
| To a clean container, the following were slowly added under agitation | |
| Toluene | 9.25 |
| N-butyl-alcohol | 0.53 |
| Xylene | 5.54 |
| Dimethyl carbonate | 0.57 |
| DOWSIL DC249[11] (polysiloxane, Mw 2000-4000) | 4.07 |
| GENIOSIL XL 10 (alkoxy silane) | 0.38 |
| KEN-REACT KR30 | 0.34 |
| ANTI-TERRA U | 0.34 |
| BENTONE SD-1 | 0.91 |
| MICRO MICA C-3000 | 15.83 |
| Calcium silicate | 2.33 |
| High speed mixing (Cowles) to a grind greater than #5 (Hegman) for (20-60 minutes) | |
| Afterwards, the following were added while mixing | |
| Barrier pigment | 43.03 |
| SILRES MSE 100 (methyl polysiloxane) | 16.08 |
| Tetra-n-butyl titanate | 0.80 |
| Total | 100 |

Part B

| | |
|---|---|
| To a clean container, the following were slowly added under agitation | |
| N-butyl-alcohol | 0.82 |
| Aromatic 150 solvent | 10.26 |

-continued

| Description | Lbs. |
|---|---|
| Xylene | 12.36 |
| Dimethyl carbonate | 22.37 |
| DOWSIL DC249 (polysiloxane, Mw 2000-4000) | 7.75 |
| KEN-REACT KR30 | 0.54 |
| ANTI-TERRA U | 0.54 |
| Borate pigment | 25.95 |
| BENTONE SD-1 | 1.43 |
| VANSIL W-30 WOLLASTONITE | 17.29 |
| High speed mixing (Cowles) to a grind greater than #5 (Hegman) for (20-60 minutes) | |
| Afterwards, the following were added while mixing | |
| Inorganic dryer | 0.71 |
| Total | 100 |

[11]Methyl phenyl polysiloxane, Mw 2000-4000, available from Dow Chemical Company (Midland, MI)

Comparative Example 4

| Description | Lbs. |
|---|---|
| Part A | |
| To a clean container, the following were slowly added under agitation | |
| Toluene | 10.21 |
| N-butyl-alcohol | 0.58 |
| Xylene | 6.11 |
| Dimethyl carbonate | 0.63 |
| DOWSIL DC249 (polysiloxane, Mw 2000-4000) | 4.49 |
| GENIOSIL XL 10 (alkoxy silane) | 0.42 |
| KEN-REACT KR30 | 0.38 |
| ANTI-TERRA U | 0.38 |
| BENTONE SD-1 | 1.00 |
| MICRO MICA C-3000 | 14.68 |
| Calcium silicate | 2.57 |
| High speed mixing (Cowles) to a grind greater than #5 (Hegman) for (20-60 minutes) | |
| Afterwards, the following were added while mixing | |
| Barrier pigment | 39.91 |
| SILRES MSE100 (methyl polysiloxane) | 17.75 |
| Tetra-n-butyl titanate | 0.89 |
| Total | 100 |

Part B

| | |
|---|---|
| To a clean container, the following were slowly added under agitation | |
| N-butyl-alcohol | 0.63 |
| Aromatic 150 solvent | 7.85 |
| Xylene | 9.46 |
| Dimethyl carbonate | 17.12 |
| DOWSIL DC249 (poly siloxane, Mw 2000-4000) | 5.93 |
| KEN-REACT KR30 | 0.41 |
| ANTI-TERRA U | 0.41 |
| Borate pigment | 16.69 |
| BENTONE SD-1 | 1.09 |
| HALOX SZP391 | 28.75 |
| VANSIL W-30 WOLLASTONITE | 11.12 |
| High speed mixing (Cowles) to a grind greater than #5 (Hegman) for (20-60 minutes) | |
| Afterwards, the following were added while mixing | |
| Inorganic dryer | 0.54 |
| Total | 100 |

Example 5

| Description | Lbs. |
|---|---|
| Part A | |
| To a clean container, the following were slowly added under agitation | |
| Toluene | 10.21 |
| N-butyl-alcohol | 0.58 |
| Xylene | 3.12 |
| Dimethyl carbonate | 0.63 |
| SILRES REN60[12] (polysiloxane, Mw >20,000) | 7.48 |
| GENIOSIL XL10 (alkoxy silane) | 0.42 |
| KEN-REACT KR30 | 0.38 |
| ANTI-TERRA U | 0.38 |
| BENTONE SD-1 | 1.00 |
| MICRO MICA C-3000 | 14.68 |
| Calcium silicate | 2.57 |
| High speed mixing (Cowles) to a grind greater than #5 (Hegman) for (20-60 minutes) | |
| Afterwards, the following were added while mixing | |
| Barrier pigment | 39.91 |
| SILRES MSE100 (methyl polysiloxane) | 17.75 |
| Tetra-n-butyl titanate | 0.89 |
| Total | 100 |
| Part B | |
| To a clean container, the following were slowly added under agitation | |
| N-butyl-alcohol | 0.63 |
| Aromatic 150 solvent | 7.85 |
| Xylene | 5.50 |
| Dimethyl carbonate | 17.12 |
| SILRES REN60 (polysiloxane, Mw >20,000) | 9.89 |
| KEN-REACT KR30 | 0.41 |
| ANTI-TERRA U | 0.41 |
| Borate pigment | 16.69 |
| BENTONE SD-1 | 1.09 |
| HALOX SZP391 | 28.75 |
| VANSIL W-30 WOLLASTONITE | 11.12 |
| High speed mixing (Cowles) to a grind greater than #5 (Hegman) for (20-60 minutes) | |
| Afterwards, the following were added while mixing | |
| Inorganic dryer | 0.54 |
| Total | 100 |

[12]Methyl phenyl polysiloxane, Mw >20,000, available from Wacker Chemical Corporation (Adrian, MI)

Example 6

| Description | Lbs. |
|---|---|
| Part A | |
| To a clean container, the following were slowly added under agitation | |
| Toluene | 10.21 |
| N-butyl-alcohol | 0.58 |
| Xylene | 1.62 |
| Dimethyl carbonate | 0.63 |
| DOWSIL DC808[13] (polysiloxane, Mw >200,000) | 8.98 |
| GENIOSIL XL 10 (alkoxy silane) | 0.42 |
| KEN-REACT KR30 | 0.38 |
| ANTI-TERRA U | 0.38 |
| BENTONE SD-1 | 1.00 |
| MICRO MICA C-3000 | 14.68 |
| Calcium silicate | 2.57 |
| High speed mixing (Cowles) to a grind greater than #5 (Hegman) for (20-60 minutes) | |
| Afterwards, the following were added while mixing | |
| Barrier pigment | 39.91 |
| DOWSIL 2403[14] (methyl polysiloxane) | 17.75 |
| Tetra-n-butyl titanate | 0.89 |
| Total | 100 |
| Part B | |
| To a clean container, the following were slowly added under agitation | |
| N-butyl-alcohol | 0.63 |
| Aromatic 150 solvent | 7.85 |
| Xylene | 3.52 |
| Dimethyl carbonate | 17.12 |
| DOWSIL DC808 (polysiloxane, Mw >200,000) | 11.87 |
| KEN-REACT KR30 | 0.41 |
| ANTI-TERRA U | 0.41 |
| Borate pigment | 16.69 |
| BENTONE SD-1 | 1.09 |
| HALOX SZP391 | 28.75 |
| VANSIL W-30 WOLLASTONITE | 11.12 |
| High speed mixing (Cowles) to a grind greater than #5 (Hegman) for (20-60 minutes) | |
| Afterwards, the following were added while mixing | |
| Inorganic dryer | 0.54 |
| Total | 100 |

[13]Methyl phenyl polysiloxane, Mw >200,000, available from Dow Chemical Company (Midland, MI)
[14]Methyl polysiloxane, available from Dow Chemical Company (Midland, MI)

Example 7

| Description | Lbs. |
|---|---|
| Part A | |
| To a clean container, the following were slowly added under agitation | |
| Toluene | 10.21 |
| N-butyl-alcohol | 0.58 |
| Xylene | 1.62 |
| Dimethyl carbonate | 0.63 |
| SILRES REN50 (polysiloxane, Mw >100,000) | 8.98 |
| GENIOSIL XL10 (alkoxy silane) | 0.42 |
| KEN-REACT KR30 | 0.38 |
| ANTI-TERRA U | 0.38 |
| BENTONE SD-1 | 1.00 |
| MICRO MICA C-3000 | 14.68 |
| Calcium silicate | 2.57 |
| High speed mixing (Cowles) to a grind greater than #5 (Hegman) for (20-60 minutes) | |
| Afterwards, the following were added while mixing | |
| Barrier pigment | 39.91 |
| SILRES MSB 100 (methyl polysiloxane) | 17.75 |
| Tetra-n-butyl titanate | 0.89 |
| Total | 100 |
| Part B | |
| To a clean container, the following were slowly added under agitation | |
| N-butyl-alcohol | 0.63 |
| Aromatic 150 solvent | 7.85 |
| Xylene | 3.52 |
| Dimethyl carbonate | 17.12 |
| SILRES REN50 (polysiloxane, Mw >100,000) | 11.87 |
| KEN-REACT KR30 | 0.41 |
| ANTI-TERRA U | 0.41 |
| Borate pigment | 16.69 |
| BENTONE SD-1 | 1.09 |
| NUBIROX 301[15] (calcium phosphate) | 28.75 |
| VANSIL W-30 WOLLASTONITE | 11.12 |
| High speed mixing (Cowles) to a grind greater than #5 (Hegman) for (20-60 minutes) | |
| Afterwards, the following were added while mixing | |

-continued

| Description | Lbs. |
|---|---|
| Inorganic dryer | 0.54 |
| Total | 100 |

[15] Calcium strontium phosphosilicate, available from The Cary Company (Addison, IL)

Example 8

| Description | Lbs. |
|---|---|
| Part A | |
| To a clean container, the following were slowly added under agitation | |
| Toluene | 10.21 |
| N-butyl-alcohol | 0.58 |
| Xylene | 1.62 |
| Dimethyl carbonate | 0.63 |
| SILRES REN50 (polysiloxane, Mw >100,000) | 8.98 |
| GENIOSIL XL10 (alkoxy silane) | 0.42 |
| KEN-REACT KR30 | 0.38 |
| ANTI-TERRA U | 0.38 |
| BENTONE SD-1 | 1.00 |
| MICRO MICA C-3000 | 14.68 |
| Calcium silicate | 2.57 |
| High speed mixing (Cowles) to a grind greater than #5 (Hegman) for (20-60 minutes) | |
| Afterwards, the following were added while mixing | |
| Barrier pigment | 39.91 |
| SILRES MSE 100 (methyl polysiloxane) | 17.75 |
| Tetra-n-butyl titanate | 0.89 |
| Total | 100 |
| Part B | |
| To a clean container, the following were slowly added under agitation | |
| N-butyl-alcohol | 0.63 |
| Aromatic 150 solvent | 7.85 |
| Xylene | 3.52 |
| Dimethyl carbonate | 17.12 |
| SILRES REN50 (polysiloxane, Mw >100,000) | 11.87 |
| KEN-REACT KR30 | 0.41 |
| ANTI-TERRA U | 0.41 |
| Borate pigment | 16.69 |
| BENTONE SD-1 | 1.09 |
| HALOX 700[16] (aluminum phosphate) | 28.75 |
| VANSIL W-30 WOLLASTONITE | 11.12 |
| High speed mixing (Cowles) to a grind greater than #5 (Hegman) for (20-60 minutes) | |
| Afterwards, the following were added while mixing | |
| Inorganic dryer | 0.54 |
| Total | 100 |

[16] Aluminum-zinc phosphate, available from ICL Specialty Products Inc. (Hammond, IN)

Example 9

| Description | Lbs. |
|---|---|
| Part A (Part B with titanate only) | |
| To a clean container, the following were slowly added under agitation | |
| Toluene | 6.98 |
| N-butyl-alcohol | 0.60 |
| Xylene | 2.22 |
| Aromatic 150 solvent | 2.48 |
| SILRES REN50 (polysiloxane, Mw >100,000) | 9.89 |
| GENIOSIL XL10 (alkoxy silane) | 0.29 |
| KEN-REACT KR30 | 0.39 |
| ANTI-TERRA U | 0.39 |
| Inorganic dryer | 0.17 |
| BENTONE SD-1 | 1.03 |
| MICRO MICA C-3000 | 10.05 |
| Borate pigment | 5.27 |
| Calcium silicate | 5.27 |
| HALOX SZP391 (zinc phosphate) | 9.08 |
| High speed mixing (Cowles) to a grind greater than #5 (Hegman) for (20-60 minutes) | |
| Afterwards, the following were added while mixing | |
| Barrier pigment | 27.30 |
| Dimethyl carbonate | 5.84 |
| SILRES MSE 100 (methyl polysiloxane) | 12.14 |
| Part B (when applied to substrate) | |
| Tetra-n-butyl titanate | 0.61 |
| Total | 100 |

Example 10

| Description | Lbs. |
|---|---|
| To a clean container, the following were slowly added under agitation | |
| Toluene | 6.98 |
| N-butyl-alcohol | 0.60 |
| Xylene | 2.22 |
| Aromatic 150 solvent | 2.48 |
| SILRES REN50 (polysiloxane, Mw >100,000) | 9.89 |
| GENIOSIL XL10 (alkoxy silane) | 0.29 |
| KEN-REACT KR30 | 0.39 |
| ANTI-TERRA U | 0.39 |
| Inorganic dryer | 0.17 |
| BENTONE SD-1 | 1.03 |
| MICRO MICA C-3000 | 10.05 |
| Borate pigment | 5.27 |
| Calcium silicate | 5.27 |
| HALOX SZP 391 (zinc phosphate) | 9.08 |
| High speed mixing (Cowles) to a grind greater than #5 (Hegman) for (20-60 minutes) | |
| Afterwards, the following were added while mixing | |
| Barrier pigment | 27.30 |
| Dimethyl carbonate | 5.84 |
| SILRES MSE100 (methyl polysiloxane) | 12.14 |
| Tetra-n-butyl titanate | 0.61 |
| Total | 100 |

For Examples 1-8 (two component system), two parts A were mixed with one part B (by volume) with a mechanical agitator. For Example 9 (also two component system), 93.3 parts A were mixed with one part B (by volume) with a mechanical agitator. For Example 10 (one component system), all items were mixed with a mechanical agitation. The mixtures in Examples 1-10 were each applied direct to metal on carbon steel panels using a HVLP air spray gun with tip opening of 1.7 mm to produce coatings at ambient conditions on the panels at 10-12 mils of dry film thickness.

Testing

The following tests were performed on the coatings of Examples 1-10.

Accelerated Thermal Cyclic Corrosion Test: The accelerated thermal cyclic corrosion test method used a programmable oven and a salt fog chamber based on ASTM B117 salt fog test. The B117 salt fog test is an ASTM standardized corrosion test method, used to check corrosion resistance of materials and surface coatings. It is an accelerated corrosion test that produces a corrosive attack to coated samples in order to evaluate the suitability of the coating for use as a protective finish. The appearance of corrosion products (rust or other oxides) is evaluated after a pre-determined period of time. Test duration depends on the corrosion resistance of the coating; generally, the more corrosion resistant the coating is, the longer the period of testing before the appearance of corrosion/rust.

The test included intermittent salt fog exposure post thermal cyclic load. Each cycle included 3 days dry heat cyclic exposure from ambient to 800° F. (427° C.). Panels were quenched in cold water at the end of each day during dry cycle. After 3 days dry cycle, panels were placed in a B117 salt spray chamber for 3 days. Panels were inspected after each cycle (rust rating per ASTM D610 and blistering/cracking ratings per ASTM D1654-08). The test duration continued until there was an appearance of blistering/cracking/delaminating, corrosion, and/or rust. A higher number of cycles before such deterioration is indicative of improved corrosion resistance. Pull off adhesion and heat resistance were tested according to ASTM D4541-17 and ASTM 2485-18, respectively. Results of the testing are reported in Table 2 with images of the tested panels in FIG. 1. The panels shown in FIG. 1 demonstrate the failed corrosion resistance of Comparative Example 2 (no corrosion inhibitor), Comparative Example 3 (low Mw polysiloxane and no corrosion inhibitor) and Comparative Example 4 (low Mw polysiloxane with corrosion inhibitor). It will be appreciated that the presence of corrosion inhibitor is insufficient to provide suitable corrosion resistance when low Mw polysiloxane is included instead of the high Mw polysiloxane of the present invention. Example 1 was compared with commercially available products as reported in Table 3.

Whereas particular embodiments of this invention have been described above for purposes of illustration, it will be evident to those skilled in the art that numerous variations of the details of the present invention may be made without departing from the invention as defined in the appended claims.

The invention claimed is:

1. An ambient curable coating composition comprising a mixture of components comprising:
(a) a polysiloxane having a molecular weight (Mw) of at least 20,000 as determined by gel permeation chromatography using polystyrene standard;
(b) an alkoxy functional polysiloxane;
(c) an inorganic corrosion inhibitor; and
(d) a curing agent;
wherein the coating composition is curable at ambient temperatures in the range of 2° C. to 60° C. by crosslinking the alkoxy functional polysiloxane using water; and wherein the coating composition does not contain any mono-epoxides or di-epoxides.

2. The coating composition of claim 1, where the Mw of component (a) is at least 100,000.

3. The coating composition of claim 1, where the Mw of component (a) is at least 200,000.

4. The coating composition of claim 1, wherein component (a) comprises an alkyl aryl polysiloxane.

5. The coating composition of claim 1, wherein component (b) comprises an alkoxy functional alkyl polysiloxane.

6. The coating composition of claim 1, wherein the inorganic corrosion inhibitor (c) comprises magnesium oxide, zinc phosphate, metal-modified zinc phosphates, metal-modified phosphosilicate and/or metal-modified borosilicate, wherein the metal comprises calcium, barium, strontium, molybdenum, magnesium, and/or aluminum.

7. A method of preparing a coating comprising:
(i) applying the coating composition of claim 1 to a substrate; and
(ii) curing component (b) using water at ambient temperatures in the range of 2° C. to 60° C.

8. A substrate at least partially coated with the coating composition of claim 1.

9. The substrate of claim 8, wherein the substrate is metal.

10. An industrial processing component comprising the substrate of claim 9.

11. The industrial processing component of claim 10, wherein the industrial processing component comprises a reactor, exhaust stack, reformer, distillation column, piping, valve, heat exchanger, boiler or storage tank, or aircraft engine.

TABLE 2

| | Resins and Inhibitor | | | | Thermal Cyclic Corrosion Test | | | | |
|---|---|---|---|---|---|---|---|---|---|
| Example | Low MW siloxane | High MW siloxane | Methoxy siloxane | Inhibitor | No. of cycles | Blistering | Rusting | Cracking | Pull off (psi) | Heat resistance |
| Ex 1 | | yes | yes | yes | 8 | No blister | 10 | No cracking | 431, AD 286, 1100° F. | Pass, 1100° F. |
| CE 2 | | yes | yes | no | 8 | No blister | 8 | No cracking | 604, AD 327, 1100° F. | Pass, 1100° F. |
| CE 3 | yes | | yes | no | 6 | No blister | 5 | No cracking | 295, AD 287, 1100° F. | Checking, 1100° F. |
| CE 4 | yes | | yes | yes | 6 | No blister | 4 | No cracking | 252, AD 357, 1100° F. | Checking, 1100° F. |
| Ex 5 | | yes | yes | yes | 8 | No blister | 10 | No cracking | 619, AD 290, 1100° F. | Pass, 1100° F. |
| Ex 6 | | yes | yes | yes | 8 | No blister | 10 | No cracking | 255, AD 380, 1100° F. | Pass, 1100° F. |
| Ex 7 | | yes | yes | yes | 8 | No blister | 10 | No cracking | 393, AD 348, 1100° F. | Pass, 1100° F. |
| Ex 8 | | yes | yes | yes | 8 | No blister | 10 | No cracking | 541, AD 261, 1100° F. | Pass, 1100° F. |
| Ex 9 | | yes | yes | yes | 8 | No blister | 10 | No cracking | 370, AD 311, 1100° F. | Pass, 1100° F. |
| Ex 10 | | yes | yes | yes | 8 | No blister | 10 | No cracking | 375, AD 286, 1100° F. | Pass, 1100° F. |

TABLE 3

Benchmark Test Results on Thermal Cyclic Corrosion Test

| Coating | No. of cycles | Field rust | Blistering | Cracking |
|---|---|---|---|---|
| EXAMPLE 1 | 10 | 10 | No blister | No cracking |
| Commercial Product[18] | 2 | 6 | No blister | No cracking |
| Commercial Product[19] | 2 | 6 | No blister | No cracking |
| Commercial Product[20] | 1 | 4 | No blister | Significant cracking |

[18]HEAT-FLEX HI-TEMP 1200 from Sherwin-Williams
[19]INTERBOND 1202UPC from AkzoNobel
[20]THERMALINE HEAT SHIELD from Carboline 12. An ambient curable, two-component coating composition comprising:
- A. a first component comprising:
  - a. a polysiloxane having a molecular weight (Mw) of at least 20,000 as determined by gel permeation chromatography using a polystyrene standard;
  - b. an alkoxy functional polysiloxane; and
  - c. a curing agent selected from the group consisting of an alkyl titanate, sulphonic acid, phosphoric acid, boric acid, a zinc compound, and acetyl acetonate; and
- B. a second component separate from the first component, comprising
  - a. an inorganic corrosion inhibitor; and
  - b. additional polysiloxane having a molecular weight (Mw) of at least 20,000 as determined by gel permeation chromatography using polystyrene standard;

wherein upon combining the first component and the second component, the coating composition is curable at ambient temperatures in the range of 2° C. to 60° C. by crosslinking the alkoxy functional polysiloxane using water; and wherein the coating composition does not contain any mono-epoxides or di-epoxides.

* * * * *